United States Patent [19]
Schave

[11] Patent Number: 6,102,022
[45] Date of Patent: Aug. 15, 2000

[54] PAVEMENT CUTTING MACHINE

[75] Inventor: Floyd D. Schave, Mesa, Ariz.

[73] Assignee: Crafco, Incorporated, Chandler, Ariz.

[21] Appl. No.: 08/779,717

[22] Filed: Jan. 7, 1997

[51] Int. Cl.$^7$ ...................................................... B28D 1/04
[52] U.S. Cl. ............................................. 125/13.01; 125/12
[58] Field of Search ............................. 125/13.01, 13.03, 125/15, 16.03, 22, 12; 192/84.96; 477/179, 171, 172, 173

[56] References Cited

U.S. PATENT DOCUMENTS

| | | | |
|---|---|---|---|
| 1,134,893 | 4/1915 | Nelson . | |
| 1,195,404 | 8/1916 | Scott . | |
| 1,207,088 | 12/1916 | Sifferman . | |
| 1,280,069 | 9/1918 | Morgan . | |
| 1,338,029 | 4/1920 | Lydecker . | |
| 1,630,422 | 5/1927 | Gillespie . | |
| 2,263,136 | 11/1941 | Knouse et al. | 143/43 |
| 2,792,900 | 5/1957 | Howard | 180/53 |
| 2,855,189 | 10/1958 | Lewis | 262/20 |
| 2,912,232 | 11/1959 | Lewis | 262/20 |
| 2,984,500 | 5/1961 | Nolen | 280/47.26 |
| 3,266,846 | 8/1966 | Luksch et al. | 299/39 |
| 3,283,588 | 11/1966 | Merchant | 73/507 |
| 3,417,638 | 12/1968 | Haase et al. | 74/720 |
| 3,547,492 | 12/1970 | Binger | 299/39 |
| 3,550,959 | 12/1970 | Alford | 299/1 |
| 3,617,091 | 11/1971 | Mooney | 299/39 |
| 3,747,981 | 7/1973 | Zuzelo | 299/39 |
| 4,035,994 | 7/1977 | Hoff | 477/173 |
| 4,175,788 | 11/1979 | Jacobson et al. | 299/1 |
| 4,204,714 | 5/1980 | Jacobson et al. | 299/1 |
| 4,249,612 | 2/1981 | Lajack | 172/43 |
| 4,310,198 | 1/1982 | Destree | 299/39 |
| 4,402,366 | 9/1983 | Dankel | 172/43 |
| 4,446,392 | 5/1984 | Jaeschke | 310/105 |
| 4,455,811 | 6/1984 | Beugelsdyk | 477/173 |
| 4,465,171 | 8/1984 | Koyama | 192/81 |
| 4,483,474 | 11/1984 | Nikolich | 227/8 |
| 4,502,578 | 3/1985 | Koyama | 192/26 |
| 4,565,268 | 1/1986 | Yamamoto et al. | 477/171 |
| 4,635,774 | 1/1987 | Sekiguchi et al. | 192/52 |
| 4,644,606 | 2/1987 | Luerken et al. | 15/330 |
| 4,771,665 | 9/1988 | Van Doorn et al. | 83/62.1 |
| 4,787,678 | 11/1988 | Holmes et al. | 299/39 |
| 4,828,090 | 5/1989 | Matsushita | 192/84.961 |
| 4,848,845 | 7/1989 | Kennedy | 299/39.3 |

(List continued on next page.)

OTHER PUBLICATIONS

Cimline, Model PCR–25 Pavement Crack Router Owner/Operator Manual, Part #160818.

Primary Examiner—Derris H. Banks
Attorney, Agent, or Firm—Nilles & Nilles, S.C.

[57] ABSTRACT

A pavement cutting machine having a rotary cutting wheel with a generally horizontal axis of rotation where rotation of the cutting wheel is selectively controlled by a clutch on either the drive shaft of the engine or a driven shaft of the cutting wheel with the clutch being activated by a deadman's switch. The machine preferably also includes a stand that enables the entire machine to be tipped forwardly about its support wheels to expose the cutting wheel so it can be serviced. The clutch preferably is an electromagnetic clutch mounted to the engine drive shaft that is selectively energized by a deadman's switch on a handle of the machine that is constructed and arranged to close upon an operator gripping handle grips of the handle. When energized or engaged, a pulley of the clutch rotates in unison with the drive shaft, transmitting torque from the engine through an endless flexible member to a driven shaft carrying the cutting wheel causing the cutting wheel to rotate. When the handle grips are released, the clutch is deenergized or disengaged, decoupling the cutting wheel from the engine thereby enabling the machine to be safely left unattended with the engine running. The stand is preferably an elongate strut pivotally mounted to a forwardly extending portion of the frame of the machine and which is constructed to permit the machine to be tipped about its support wheels to expose the cutting wheel so it can be serviced.

17 Claims, 4 Drawing Sheets

U.S. PATENT DOCUMENTS

| | | | |
|---|---|---|---|
| 4,921,308 | 5/1990 | Yelton et al. | 299/39 |
| 4,923,251 | 5/1990 | Funakawa et al. | 299/64 |
| 4,928,458 | 5/1990 | Muroya et al. | 56/11.8 |
| 4,968,099 | 11/1990 | Meister | 299/1 |
| 5,009,270 | 4/1991 | Vangsgard | 172/42 |
| 5,046,890 | 9/1991 | Dickson | 404/90 |
| 5,070,751 | 12/1991 | Harris | 83/62.1 |
| 5,104,195 | 4/1992 | Zaccho | 299/39 |
| 5,119,918 | 6/1992 | Pardee | 192/18 B |
| 5,129,755 | 7/1992 | Dickson | 404/90 |
| 5,141,090 | 8/1992 | Trojan | 192/84 |
| 5,166,162 | 11/1992 | Burhite | 404/72 |
| 5,176,426 | 1/1993 | Adamson | 299/39 |
| 5,184,705 | 2/1993 | Sekiguchi et al. | 192/84 C |
| 5,197,551 | 3/1993 | Farley | 172/42 |
| 5,215,071 | 6/1993 | Mertes et al. | 125/13.01 |
| 5,241,946 | 9/1993 | Yelton et al. | 125/14 |
| 5,252,874 | 10/1993 | Viegas | 310/103 |
| 5,307,038 | 4/1994 | Ishimaru | 335/296 |
| 5,331,794 | 7/1994 | Reichle | 56/17.4 |
| 5,361,883 | 11/1994 | Yamamoto | 192/84 C |
| 5,381,780 | 1/1995 | Yelton et al. | 125/14 |
| 5,445,256 | 8/1995 | Tabuchi et al. | 192/84 C |
| 5,452,943 | 9/1995 | Campbell | 299/39 |
| 5,508,671 | 4/1996 | Takashi | 335/296 |
| 5,515,233 | 5/1996 | Hofmann | 361/160 |
| 5,538,118 | 7/1996 | Kempf et al. | 192/33 C |
| 5,551,546 | 9/1996 | Tabayama et al. | 192/84.96 |
| 5,569,119 | 10/1996 | Dummermuth | 477/204 |
| 5,575,371 | 11/1996 | Gonda et al. | 192/84.96 |
| 5,605,033 | 2/1997 | Olmr | 56/10.2 R |
| 5,709,200 | 1/1998 | Mertes | 125/13.03 |
| 5,746,193 | 5/1998 | Swan | 125/13.03 |

PAVEMENT CUTTING MACHINE

FIELD OF THE INVENTION

The present invention relates to cutting machines and more particularly to a machine for cutting pavement to open joints and cracks in the pavement in preparation for receiving a filling material that can be a sealer.

BACKGROUND OF THE INVENTION

Pavement cutting machines, commonly also known as road routers, are used to open and clean random cracks that have formed in the pavement due to curing irregularities, wear and tear, weathering, and freezing of the pavement. Pavement cutting machines all have in common a frame and a generally circular cutting wheel carried by the frame that rotates during operation and is brought into engagement with the pavement to cut the pavement, preferably as close to the crack as possible, to thereby clean and open the crack. Once cleaned and opened, a sealant, such as tar, bitumen or asphalt is applied to fill the crack to make it relatively level while helping to prevent further cracking and deterioration of the pavement.

The cutting wheel typically consists of a relatively massive disk having a plurality of cutting elements circumferentially spaced around the wheel. During operation, it is the cutting elements that contact the pavement to abrade and thereby cut the pavement to remove the pavement to clean and open the crack. Since the pavement is typically constructed of a relatively hard material, such as concrete, brick, asphalt or another similar material, the individual cutting elements wear and must periodically be replaced.

To replace a cutting element, the pavement cutting machine must be tipped about its wheels to lift the cutting wheel sufficiently far off the ground so that the cutting wheel can be easily accessed. Unfortunately, this is no easy task because pavement cutting machines typically weigh several hundred pounds and are rather unwieldy.

In one known commercially available road router pavement cutting machine, the Cimline PCR-25 manufactured by Cimline, Inc., of Minneapolis, Minn., to access the cutting wheel the machine must first be tipped forwardly about its wheels until it bears against a bracket attached to the front end of the frame and thereafter a skid plate must be partially removed from the rear of the frame. As a result of needing to remove the skid plate to access the cutting wheel, removing any part of the cutting wheel, including replacing any of its cutting elements, is a rather time consuming job. The reason why the skid plate must be removed is because the Cimline machine cannot be tipped from its generally upright operating position far enough forwardly about the axes of its wheels.

What is needed is a stand for a pavement cutting machine that permits the machine to be tipped far enough about at least one of its wheels to expose its cutting wheel sufficiently so that the cutting wheel can be accessed and serviced without requiring the skid plate of the machine to be even partially removed.

During operation of a pavement cutting machine, it is often necessary for its operator to walk away from the machine to attend to some other matter. Unfortunately, if the engine is left running while unattended, the cutting wheel also rotates because it is coupled to the engine by a belt. Should any portion of the cutting wheel come into contact with the ground while left unattended, the machine can be self-propelled by the cutting wheel which can possibly injure someone nearby or damage the pavement cutting machine should it crash into another object.

To remedy this problem, most, if not virtually all, pavement cutting machine manufacturers have an engine kill switch that when released shuts off the engine stopping the cutting wheel. However, it is certainly undesirable to be constantly starting and stopping the engine each time the operator wishes to leave the pavement cutting machine unattended, even if for only a few moments. The more frequent starting and stopping of the engine wastes fuel and increases engine wear. And it can also undesirably increase the amount of time needed to finish the pavement cutting job sought to be done.

Although it is known to use a clutch mechanism in combination with a deadman's switch to selectively stop and start a cutting blade of a lawnmower while allowing its engine to keep running whether or not the blade is disengaged, it is not heretofore known to use a clutch mechanism to selectively control operation of the rather massive cutting wheel of a pavement cutting machine. These cutting wheels typically weigh fifty pounds or more and up until now it was thought impossible to selectively couple and decouple them to an engine without harming the engine, the clutch or both.

What is needed is a clutch mechanism for selectively coupling and decoupling a cutting wheel of a pavement cutting machine for enabling a pavement cutting machine to be left unattended while not needing to stop its engine.

SUMMARY OF THE INVENTION

A pavement cutting machine for routing and cleaning random cracks and expansion joints in pavement with the machine having a coupling mechanism for selectively coupling an engine of the machine to its cutting wheel to enable the pavement cutting machine to be left unattended with its engine running and a stand for supporting the machine in a forwardly tilted position to permit access to the cutting wheel. Preferably, the coupling mechanism is a clutch for enabling mechanical power from the engine to be selectively transferred and applied to the cutting wheel so as to enable power to be applied to the cutting wheel to cause it to rotate when it is desired to power the cutting wheel and interrupted when it is not desired to power the cutting wheel. Preferably, the clutch is an electromagnetic clutch in electrical communication with an electrical power supply for energizing the clutch to couple the engine to the cutting wheel, and a switch for selectively energizing the clutch.

The pavement cutting machine includes a frame with a support platform that carries the engine and a steering device that preferably is a handle which extends rearwardly from the frame which is grasped by an operator to steer or maneuver the machine. To enable the machine to be easily moved forwardly or rearwardly along the ground, the machine is carried by at least two and preferably a pair of spaced apart support wheels journalled for rotation in the frame and which preferably have substantially coincident axes of rotation. Extending below the platform and located generally between the support wheels is a shroud pivotally attached to the frame which rotatively carries the cutting wheel. The shroud preferably is pivotally mounted to the frame at its forward end and is movably secured at its rearward end by a linear actuator constructed and arranged to selectively move the shroud and cutting wheel up and down at least slightly to control the depth of cut of the cutting wheel.

The cutting wheel has a driven shaft journalled for rotation in a pair of spaced apart bearing assemblies in the shroud. One end of the driven shaft extends outwardly of the shroud and has a pulley mounted thereon for receiving an endless flexible member that preferably is a flexible endless belt that can be of at least partially elastomeric construction. The cutting wheel preferably has a mass such that it weighs at least about fifty pounds and typically weighs as much as eighty to one hundred pounds or more. The cutting wheel preferably is oriented within the shroud such that it has a generally horizontal cutting wheel axis, although the cutting wheel can be constructed such that its axis is adjustable at least slightly from the horizontal. Although the drive shaft is cantilevered outwardly from the engine and the driven shaft is cantilevered outwardly from the shroud, the free end of both the drive shaft and driven shaft can be received in a bearing or a bearing support to minimize shaft deflection.

The belt is also mounted on another pulley that is carried by a drive shaft of the engine. The clutch preferably is mounted on the drive shaft and the drive pulley preferably is a component of the clutch. If desired, the clutch can be mounted on the driven shaft of the cutting wheel with the driven pulley rotatively carried by the clutch.

The clutch has a bobbin that is keyed to the drive shaft for rotation in unison with the drive shaft. The bobbin preferably is keyed to the drive shaft in a manner such that it can be moved axially inwardly or outwardly along the drive shaft by at least a small amount during clutch operation. The drive pulley is rotatively supported on a bearing mounted on a portion of the bobbin. At the outer axial end of the drive shaft and clutch is a stop plate that preferably is secured to the free axial end of the drive shaft by a bolt. The clutch also includes a stationary field rotor preferably immovably anchored to the engine block and which is energized by the application of electric current to urge either the bobbin toward the drive pulley or the drive pulley toward the bobbin so that they engage and couple such that the bobbin transmits torque from the drive shaft to the drive pulley causing it to rotate substantially in unison with the drive shaft. The field rotor preferably consists of a plurality of wires wound on a generally circular core that generally encircles the outer periphery of the bobbin to create a magnetic field which urges either the bobbin into contact with the drive pulley or the drive pulley into contact with the bobbin to couple the drive shaft to the drive pulley.

Preferably, a housing of the clutch is immovably mounted to the engine block such that it is anchored to the engine block. When assembled to the engine, the pulley and bobbin are captured between the stop plate and housing. If the clutch is mounted on the driven shaft, the clutch housing and field rotor are preferably anchored to the cutting wheel shroud or another stationary part of the pavement cutting machine capable of serving as a clutch anchor.

To selectively energize and engage the clutch to control the application of power from the engine to the cutting wheel, the field rotor of the clutch is in electrical communication with both an electrical power supply and a switch. The power supply preferably is an on-board battery carried by the pavement cutting machine frame. If desired, the electrical power supply can include, alone or in combination with the battery, an alternator, a magneto, or a generator in mechanical communication with the engine drive shaft and which outputs electric current that can be rectified to produce direct current electricity or electrical power regulated to output electricity at a desired voltage or current.

The clutch energizing switch preferably is a deadman's switch arrangement constructed and arranged such that the clutch is energized and/or engaged by the switch upon one or both handle grips of a handle bar of the pavement cutting machine handle being grasped by an operator of the machine. Conversely, the deadman's switch arrangement preferably is constructed and arranged to deenergize and/or disengage the clutch when one or both handle grips of the handle are released by the operator, such as when the operator releases the handle grips to leave the machine unattended. Advantageously, as a result of the construction and arrangement of the electromagnetic clutch and deadman's switch arrangement, mechanical power from the engine is selectively decoupled or disengaged from the cutting wheel when an operator releases one or both hand grips thereby not requiring the engine to be shut off before walking away from the machine.

The deadman's switch arrangement preferably includes an electric switch carried by the handle and which is in electrical communication with wiring connected to the field rotor of the clutch. The electric switch preferably is a normally open switch mounted by a bracket to the handle.

To cause the switch to close when the handle grips are grasped, the deadman's switch assembly further includes a switch actuator that preferably is pivotally mounted to the handle. The switch actuator preferably includes a mounting arm pivotally mounted to a beam of the handle and which has a switch activating shank portion constructed and arranged to actuate, trigger or close the switch. Extending outwardly from the shank portion of the switch actuator is a hand grip arm of the switch actuator that is located adjacent to and in close proximity to the handle grip of the handle such that it can easily be gripped by the hand of an operator grasping the handle grip of the handle.

Preferably, the switch actuator is constructed such that it is movable between a switch actuating position where the shank of the switch actuator is directly in contact with or very near the switch causing the switch to close and a position disposed from the switch actuating position. Preferably, the switch actuator is moved to or disposed toward the switch actuating position when the operator grasps at least one of the handle grips of the handle. Preferably, the switch actuator is constructed such that when the handle grip is grasped it results in the switch actuator hand grip also being grasped thereby moving the switch actuator toward the switch actuating position.

In a preferred deadman's switch arrangement, the actuator is generally H-shaped, having a pair of outwardly extending arms, each of which is pivotally received by a handle beam and from which extends the switch actuator shank. Outwardly extending from the opposite end of the switch actuator shank is another pair of arms, each of which forms a hand grip, that are grasped by an operator when the operator grasps the handle grips of the pavement cutting machine handle.

The switch bracket preferably is generally U-shaped having an upper leg that carries the switch and a lower leg that forms a rest for supporting the switch actuator in a position where it does not actuate the switch. Preferably, the switch and/or upper leg limit the movement of the switch actuator toward the switch actuating position such that the switch actuator is located in the switch actuating position when the shank bears against the switch or the upper leg of the switch bracket.

In a preferred clutch energizing circuit, the circuit includes the clutch (field rotor), an electrical power supply and the clutch energizing switch all wired in series. In a second preferred clutch energizing circuit, the circuit further includes a safety switch wired in series with the clutch (field rotor), electrical power supply and clutch energizing switch. The safety switch preferably comprises a normally closed electrical switch mounted on the pavement cutting machine and which is responsive to the tilt or angular orientation of the machine such that it opens, deenergizing the clutch when the machine is tipped away from its generally horizontal operating position. An example of a suitable safety switch is a mercury switch mounted on the pavement cutting machine such that it opens when the machine is tipped away from its generally horizontal operating position.

The support stand of the pavement cutting machine is pivotally mounted to the frame of the machine. Preferably, the stand is pivotally mounted to the underside of a portion of the frame that is located forwardly of and above the axes of rotation of the support wheels. The stand is an elongate and generally rigid strut having one end mounted by a pivot to the underside of the fuel supply pedestal and a stabilizer foot mounted to its other end.

Preferably, the stand is of a length and mounted to the pavement cutting machine frame so that when tipped about its support wheels in a direction away from its handle such that the machine is supported only by the stand and its support wheels, the cutting wheel is exposed such that it can be easily serviced. Preferably, as a result of the novel mounting location and length of the stand, the machine can be tipped about its support wheels a sufficient angular distance such that the cutting wheel can be accessed without having to even at least partially remove a skid plate at the rear of the shroud before servicing the cutting wheel.

Objects, features and advantages of this invention are to provide a pavement cutting machine that can be advantageously left unattended with its motor running without its cutting wheel being powered by the engine engaging the ground and propelling the unmanned machine along the ground; saves engine wear by not requiring the engine to be stopped and restarted each time an operator of the machine wishes to leave the machine unattended; saves fuel particularly during cold weather operation by not requiring the engine to be stopped and restarted each time the machine is left unattended; utilizes a clutch of rugged and durable construction capable of substantially instantaneously coupling the engine to a rather massive cutting wheel having a weight of at least about fifty pounds; enables the engine to be left running while the machine is unattended without compromising safety; utilizes a one piece clutch construction that can be mounted on a pavement cutting machine without modification of the machine; incorporates a stand which enables the machine to be easily tipped about its support wheels in a stable and safe manner to expose at least a portion of its cutting wheel for enabling the cutting wheel to be easily serviced; enables the machine to be tipped forwardly a sufficient amount such that a portion of the cutting wheel is exposed without needing to remove a skid plate of the machine; utilizes a stand of simple, rugged, durable and economical construction and is a pavement cutting machine that is rugged, simple, flexible, reliable, and durable, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

DETAILED DESCRIPTION OF THE INVENTION

Figure 1:
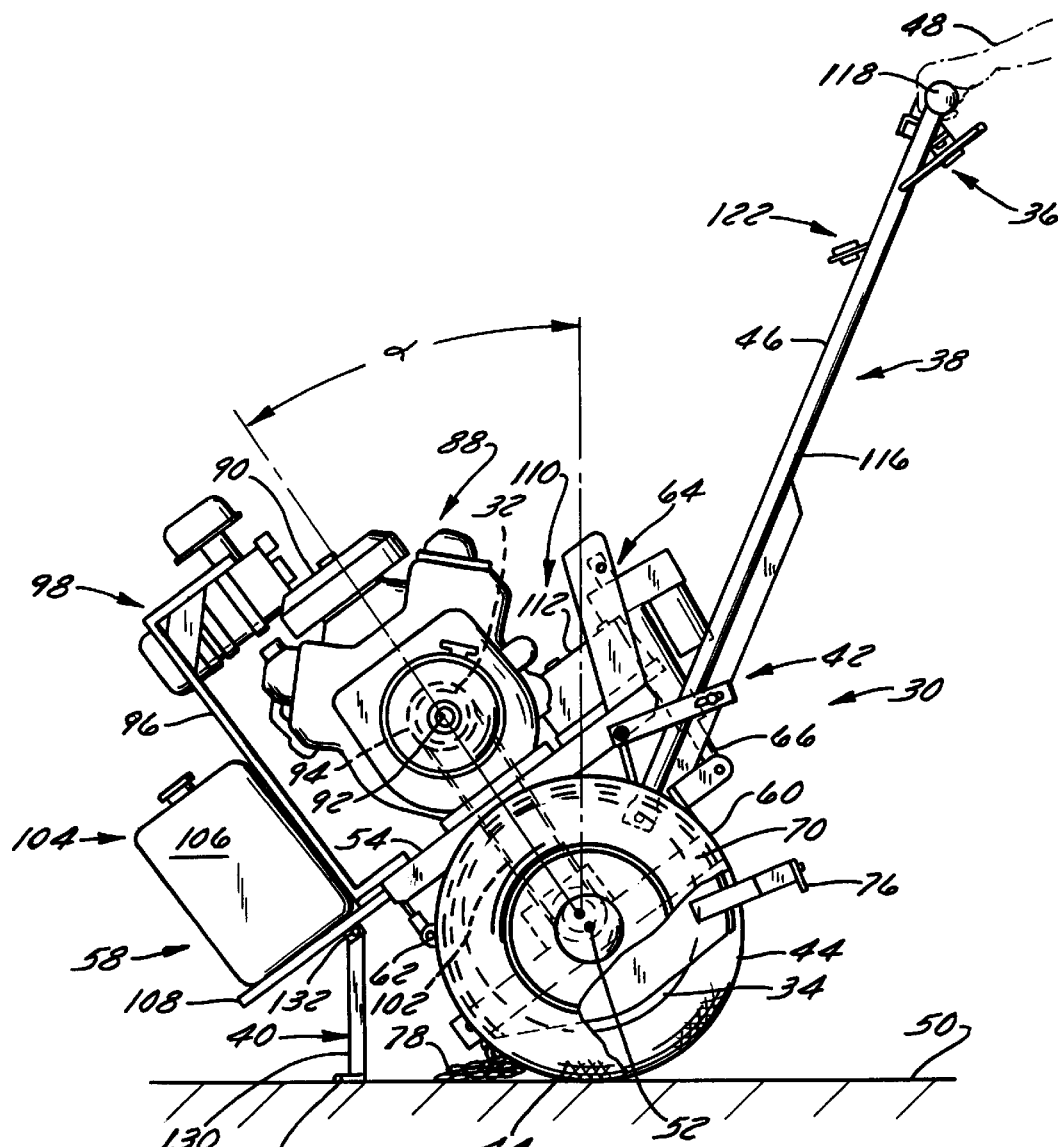
FIG. 1 is a side view of a pavement cutting machine of this invention tipped forwardly on a support stand for providing service access to a cutting wheel of the machine.

FIG. 1 depicts a pavement cutting machine 30 of this invention having a clutch 32 for enabling power to be selectively applied to a cutting wheel 34 of the machine 30 and which is preferably controlled through the use of a deadman's switch arrangement 36 carried by a steering device 38 of the machine 40. Preferably, the pavement cutting machine 30 further includes a support stand 40 carried by a frame 42 of the machine 30 which permits the machine 30 to be tipped forwardly about its wheels 44 to provide service access to the cutting wheel 44. Preferably, the steering device 38 is a handle 46 attached to the frame 42 that is constructed and arranged to enable an operator 48, only a small portion of whom is shown in phantom in FIG. 1, to steer, tip and otherwise maneuver the pavement cutting machine 30.

The pavement cutting machine 30 has a carriage 42 that includes a frame 42 which carries a pair of spaced apart support wheels 44 that each have a preferably pneumatic tire which enable the machine to be movably supported on the pavement 50 in a manner that it can be easily moved forwardly or rearwardly along the pavement 50. Both support wheels 44 preferably share a common axis of rotation 52. Preferably, both support wheels 44 are spaced apart such that one support wheel 44 lies on one side of the cutting wheel 34 and the other support wheel lies on the other side of the cutting wheel 34 such that the cutting wheel 34 is located generally between the support wheels 44.

Preferably, if desired, the axis of rotation of the cutting wheel 34 can be generally the same as the axes 52 of the support wheels 44. Alternatively, the cutting wheel 34 can be located relative to the support wheels 44 such that its axis of rotation is located either forwardly of, rearwardly of, above or below the axes of rotation of the support wheels 44. Located adjacent and slightly above the wheels 44 is a central generally horizontal support platform 54 of the frame 42 that extends from adjacent the front to adjacent the rear of the pavement cutting machine 30 and which also preferably lies between the wheels 44.

For the purpose of providing a reference for introducing pavement cutting machine components and explaining relative relationships between components and the locations of the pavement cutting machine 30, the rear 56 of the machine 30 will be generally referred to herein where a component is located toward that portion of the pavement cutting machine 30 that is generally adjacent or closest to the handle 46 and the front 58 of the pavement cutting machine 30 will be generally referred to herein where a component is located toward that portion of the machine 30 that is distal to the handle 46. This frame of reference is provided to make clear the connotation front and back in relative terms and because during operation the machine 30 is typically pulled or urged toward the operator 48 and handle 46.

Secured to the frame 42 below the platform 54 is an arcuately shaped shroud 60 which substantially encloses the cutting wheel 34 to protect an operator of the machine 30 from debris expelled outwardly from the cutting wheel 34 during operation. The shroud 60 preferably is pivotally connected to the frame 42 such that it can pivot independently relative to the support wheels 44 of the machine 30. Preferably, the shroud 60 and cutting wheel 34 are connected to the front of the frame 42 by a pivot 62 and to the rear of the frame 42 by an actuator and linkage assembly 64 that preferably includes an actuator 66 which can be selectively controlled by the operator to relatively accurately control the depth of cut of the cutting wheel 34 during operation. Preferably, the actuator 66 is a linear actuator such as a hydraulic cylinder, pneumatic cylinder, a ballscrew assembly, or another type of actuator, linear or non-linear, capable of raising or lowering the cutting wheel 34 relative to the frame 42, and preferably also relative to the support wheels 44, to help enable the depth of cut of the cutting wheel 34 to be controlled.

Figure 3:
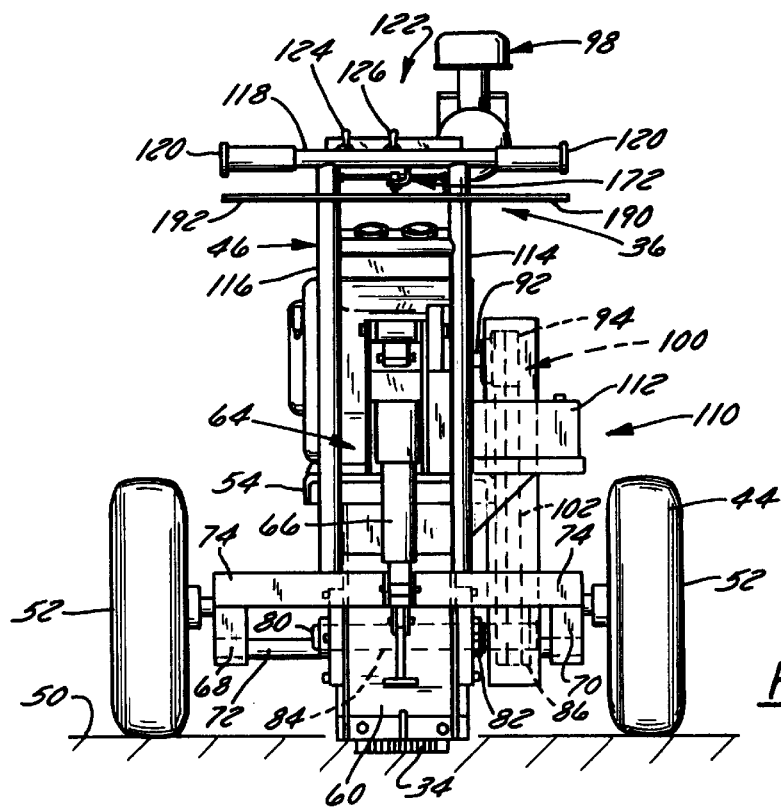
FIG. 3 is a rear view of the pavement cutting machine shown in its operating position.

Framing the cutting wheel shroud 60 is a pair of side rails 68 & 70 which are connected to a cross bar 72 in front of the shroud 60 and in the rear to a cross rail 74 that lies generally behind the shroud 60. Referring to FIG. 3, each side rail 68 & 70 has a stub axle that extends outwardly therefrom to which one of the support wheels 44 is rotatably mounted. So that both support wheels 44 have a generally common axis of rotation, the stub axles are preferably mounted to the side rails 68 & 70 such that they also share a substantially common axis.

Mounted to the rear and adjacent the bottom of the shroud 60 is a skid plate 76 that drags on the pavement 50 when the machine 30 is moved along the pavement 50 during operation to better control the speed and accuracy of the cut made in the pavement 50 by the cutting wheel 34. Mounted to the front and adjacent the bottom of the shroud 60 there is a curtain of chains 78 which also helps to stop debris expelled from the cutting wheel 34.

As is shown in FIG. 3, the cutting wheel 34 is rotatably journalled to the shroud 60 with it being rotatably supported on one side by a bearing 80 carried by the shroud 60 and on its other side by another bearing 82 also carried by the shroud 60. The generally circular cutting wheel 34 is preferably mounted on a centrally located driven shaft 84 rotatably supported by the bearings 80 & 82 and which has a portion that extends outwardly of the shroud 60 to which a sheave or pulley 86 is mounted.

Although not clearly shown, the cutting wheel 34 preferably consists of a pair of axially spaced apart and generally circular metal disks that have a plurality of generally star-shaped cutting wheel elements rotatably mounted between the disks adjacent their radially outer peripheral edge. Preferably, the disks are constructed of steel, cast iron or another metal or composite material. Preferably, the cutting wheel 34 has a mass such that it weighs at least about fifty pounds under the gravity of the Earth. Preferably, with cutting elements mounted, the cutting wheel 34 has a mass such that it weighs at least about eighty pounds and can weigh as much as one hundred pounds or more. During operation, the cutting wheel 34 rotates causing a portion of each cutting element to come into contact with the pavement 50 during a single rotation of the cutting wheel 34 to abrade the pavement 50 to cut or otherwise displace the pavement 50.

To cause the cutting wheel 34 to rotate, the pavement cutting machine 30 is equipped with a prime mover 88 carried by the frame 42 and which is operably connected to the cutting wheel 34 to provide power to the cutting wheel 34 during operation to cause the cutting wheel 34 to rotate. The prime mover 88 preferably is an internal combustion engine 90 mounted on the support platform 54 of the frame 42 and, as is shown more clearly in FIGS. 3–5, has a drive shaft 92 with a sheave or pulley 94 carried by the shaft 92. The engine 90 preferably is a gasoline engine, a diesel engine, a propane engine or another type of internal combustion engine. Attached to a bracket 96 mounted on the platform 54 adjacent to and shown above the engine 90 in FIG. 1 is an exhaust manifold and muffler assembly 98 of the engine 90. An endless flexible member 100 that preferably is a generally flexible belt 102, a chain, a flexible elastomeric gear drive chain, a cable or plurality of cables, wire rope, or the like, connects the drive shaft pulley 94 to the driven shaft pulley 86 to communicate rotary power from the drive shaft 92 to the driven shaft 84 to rotate the cutting wheel 34.

A fuel supply 104 for the engine 90 that preferably is a fuel tank 106 for preferably holding a liquid or gaseous fuel is carried by a support pedestal 108 that extends outwardly from the platform 54. An electrical power supply 110 that preferably consists of at least a battery 112, such as a lead-acid, lithium ion, nickel-hydride, zinc-carbon or another type of battery, including a wet or dry cell battery, is carried by the support platform 54 adjacent the engine 90. Independently of or in addition to the battery 112, the electrical power supply 110 can also consist of a generator, a magneto, or an alternator operably connected to the drive shaft 92 of the engine 90 or driven shaft 84 to provide electrical power during engine operation. Generated electrical power preferably can be regulated by a power regulator that can include one or more diodes, such as zener diodes, where rectification into direct current is desired or required.

Figure 6:
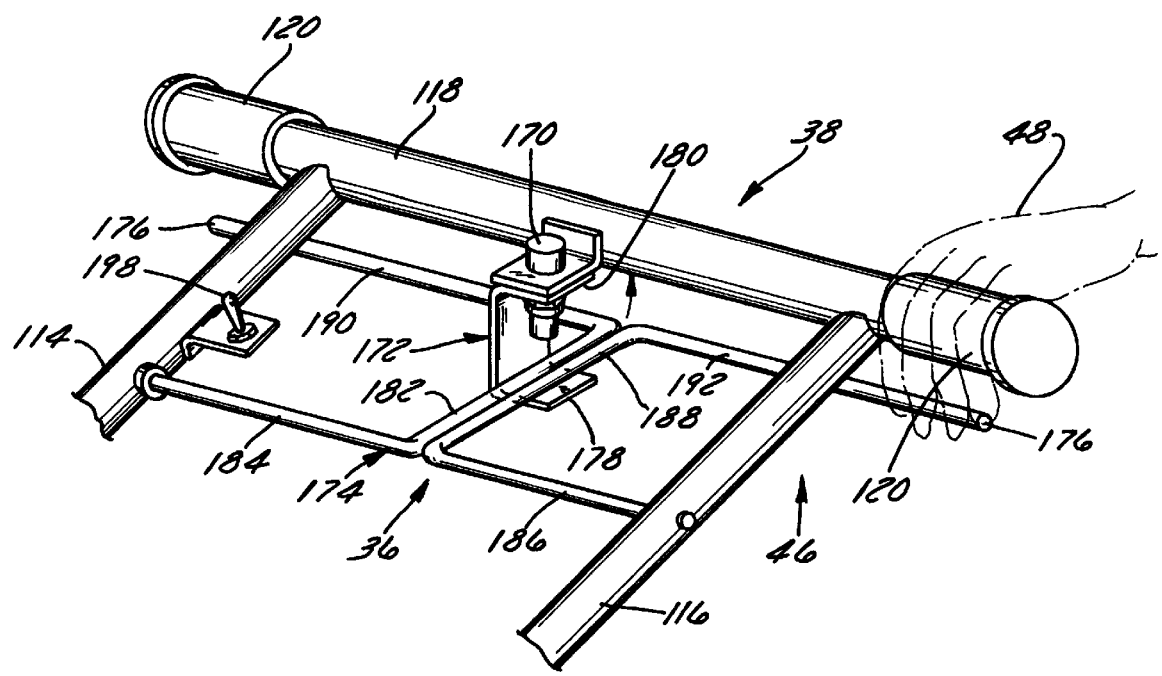
FIG. 6 is a partial fragmentary perspective view of a handle of the pavement cutting machine illustrating a deadman's switch arrangement operably associated with the handle and which is constructed and arranged to control selective operation of the clutch.

The handle 46 of the pavement cutting machine 30 preferably is constructed and arranged to permit steering and maneuvering of the machine 30 by an operator who is standing generally uprightly. Referring to FIG. 3, in a preferred handle embodiment, the handle 46 consists of a pair of spaced apart and elongate tubular beams 114 & 116 each of which extends upwardly at an angle from the frame 42. Preferably, one end of each handle beam 114 & 116 can be affixed to the side rails 68 & 70 or the shroud 60 or another portion of the frame 42 and there is a handle bar 118 attached to the other end of each handle beam 114 & 116. Referring additionally to FIG. 6, the handlebar 118 extends outwardly on each side generally transversely from the handle beams 114 & 116 and has a handle grip 120 on each outwardly extending portion.

Figure 2:
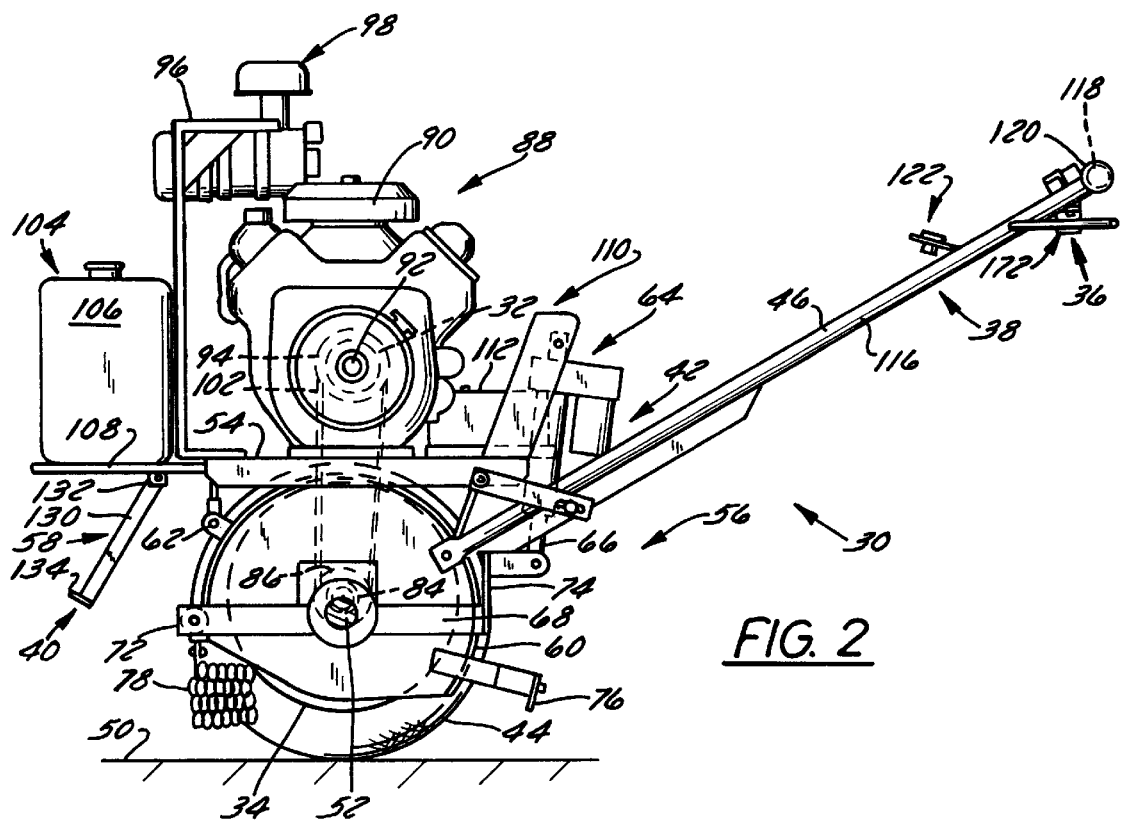
FIG. 2 is a side view of the pavement cutting machine shown in an upright and generally horizontal operating position.

For the preferred handle embodiment shown in the drawing figures and with the pavement cutting machine 30 in the generally upright position shown in FIG. 2, the handle 46 is inclined at an angle relative to the horizontal (ie. pavement 50) of between about 20° and about 50° and preferably between about 25° and about 35° for facilitating easy maneuverability of the machine 30 as well as enabling it to be easily tipped forwardly about its support wheels 44.

During operation, at least one and preferably both of the handle grips 120 are grasped by the operator 48 to steer the machine 30 and to help urge it forwardly or rearwardly to cut and clean random cracks in pavement 50. To control pavement cutting machine operation, the handle 46 can be constructed to carry an instrument panel 122 that has a cutting wheel height adjust switch 126 and an engine kill switch 124, if desired, such as is depicted in FIG. 3. Other switches or controls, such as for engine throttle, engine choke, engine start, skid pad adjustment, and for controlling or regulating other components of the machine 30 can also be mounted on the panel 122 or handle 46.

Preferably, the pavement cutting machine 30 of this invention can be constructed substantially in accordance with the pavement cutting machines disclosed in U.S. Pat. Nos. 4,175,788 and 4,204,714, both assigned to the assignee herein, the disclosures of both of which are hereby expressly incorporated herein.

To permit the cutting wheel 34 to be accessed, such as for servicing the cutting wheel 34 to remove and replace one or more cutting elements mounted to the cutting wheel disks, the pavement cutting machine 30 has a stand 40 pivotally carried by the frame 42 for enabling the machine 30 to be tipped forwardly about its support wheels 44. Referring to FIGS. 1 & 2, the stand 40 comprises an elongate strut 130 mounted by a pivot 132 to the fuel tank pedestal 108. Preferably, the support stand strut 130 is pivotally mounted to the underside of the pedestal 108. Although a single strut 130 is preferred, the stand 40 can consist of two or more spaced apart pivotally mounted struts that can pivot independently of each other or which can be joined such that they pivot in unison during use and operation of the stand 40.

Preferably, the support stand strut mounting structure includes a pair of spaced apart knuckles on the pedestal (only one of which is shown in each of FIGS. 1 & 2) each having a generally coaxially aligned bore for receiving a pivot axle that also extends through a bore in the support stand strut. The pivot axle preferably can be a structural bolt or cap screw having a portion of its shank adjacent its head unthreaded for functioning as the pivot axle and having its free end threaded for receiving a nut to keep the strut 130 pivotally secured to the pedestal 108. Preferably, the support stand strut 130 has a foot 134 at one end that is wider than the cross sectional width of the strut 130 to help support the machine 30 when tipped forwardly on the stand 40 in a stable manner.

Preferably, the support stand strut 130 and its mounting location to the frame 42 of the machine 30 are constructed and arranged to cause the machine 30 to pivot forwardly about the support wheel axis of rotation 52 such that at least a portion of the cutting wheel 34 is exposed and able to be easily accessed, such as is in the manner shown in FIG. 1. Preferably, the construction and arrangement of the support stand 40 and its mounting location on the frame 42 enables the machine 30 to be tipped forwardly as shown in FIG. 1 from its generally horizontal operating position shown in FIG. 2 by an angle, a (FIG. 1), of at least about 28° and preferably between about 25° and about 32° such that the cutting wheel 34 is suitably accessible without needing to first partially or completely remove the brake or skid plate 76 from the cutting wheel 34 or its shroud 60. By this support stand construction and mounting, the cutting wheel 34 preferably can be easily accessed by an operator kneeling adjacent a forwardly tipped pavement cutting machine 30 supported on the stand 40 without having to even at least partially remove the skid plate 76 thereby advantageously saving time.

Preferably, the support stand pivot 132 is located about 8 inches above the axis of rotation of the support wheels 44 and about 12.6 inches forwardly of the axis of rotation of the wheels 44. Preferably, when pivotally mounted to the frame 42 at this location, the stand 40 has a length of between about 8.5 inches and about 11 inches and preferably no greater than about 9.5 inches to ensure that the machine 30 is tipped sufficiently far forwardly such that the cutting wheel 34 can be accessed without needing to even partially remove or disassemble the skid plate 76 from the shroud 60. By the aforementioned stand construction and angles of tipping disclosed, when supported on the stand 40, the machine 30 is tipped far enough forwardly to stably self support the weight of the machine 30 without tipping back to its generally horizontal operating position (FIG. 2) and not too far forwardly so as to result in excess fuel leaking from the fuel tank 106.

Preferably, the strut 130 is constructed of a relatively rigid, strong and resilient material that preferably is a metal, such as steel, iron, cast iron, aluminum, titanium, or another suitable metal or metallic alloy. To enable the strut 130 to withstand constantly being used to support the pavement cutting machine 30, the foot 134 of the strut 130 can be constructed of a hardened metal such as a hardened steel or the like. When not in use, the stand 40 preferably freely hangs downwardly in an out-of-the-way position underneath the pedestal 108 so as to enable the machine 30 to be used without the strut 130 interfering with its operation.

Referring to FIGS. 4–7, to selectively control the application of power from the engine 90 to the cutting wheel 34, either the drive shaft 92 or the driven shaft 84 is equipped with a clutch 32. Preferably, the clutch 32 is constructed and arranged to withstand the sudden and severe loading or shock which can occur when a rotating drive shaft 92 of the engine 90 is coupled or linked to a stationary or generally stationary cutting wheel 34 having a relatively large mass, creating movement opposing inertia, such that the cutting wheel 34 can weigh as much as about fifty pounds and typically between about eighty pounds and about one hundred pounds or more.

Preferably, the clutch 32 is an electromagnetic clutch 32 capable of selectively coupling the rotary mechanical power output of the engine 90 to the cutting wheel 34 by the clutch 32 being energized upon selective application of electric current to the clutch 32. To selectively apply electric current to the clutch 32, the handle 46 preferably has a clutch switch arrangement 36 that preferably is a deadman's type switch arrangement 36.

Figure 4:
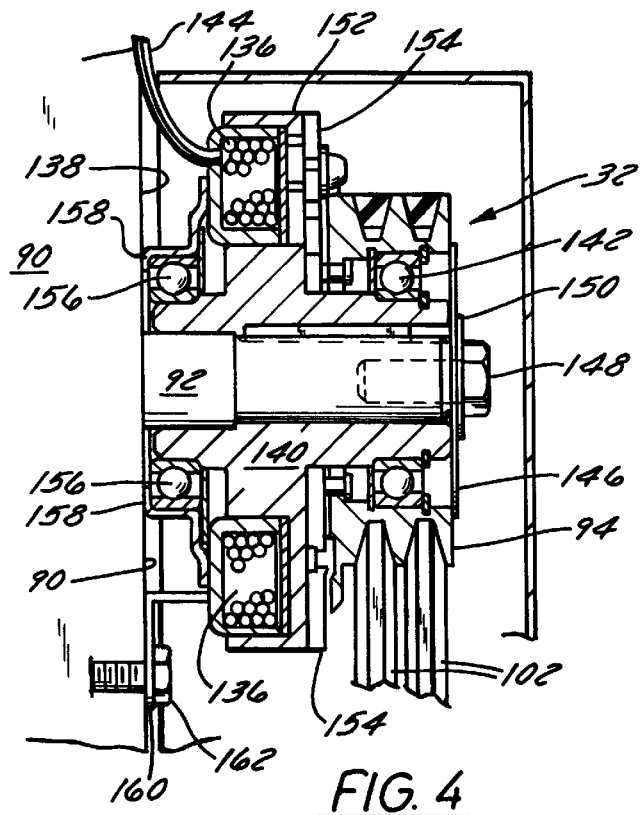
FIG. 4 is an enlarged fragmentary cross sectional view of the engine of the pavement cutting machine showing in cross section a clutch mounted on the drive shaft of an internal combustion engine that powers the machine.
Figure 5:
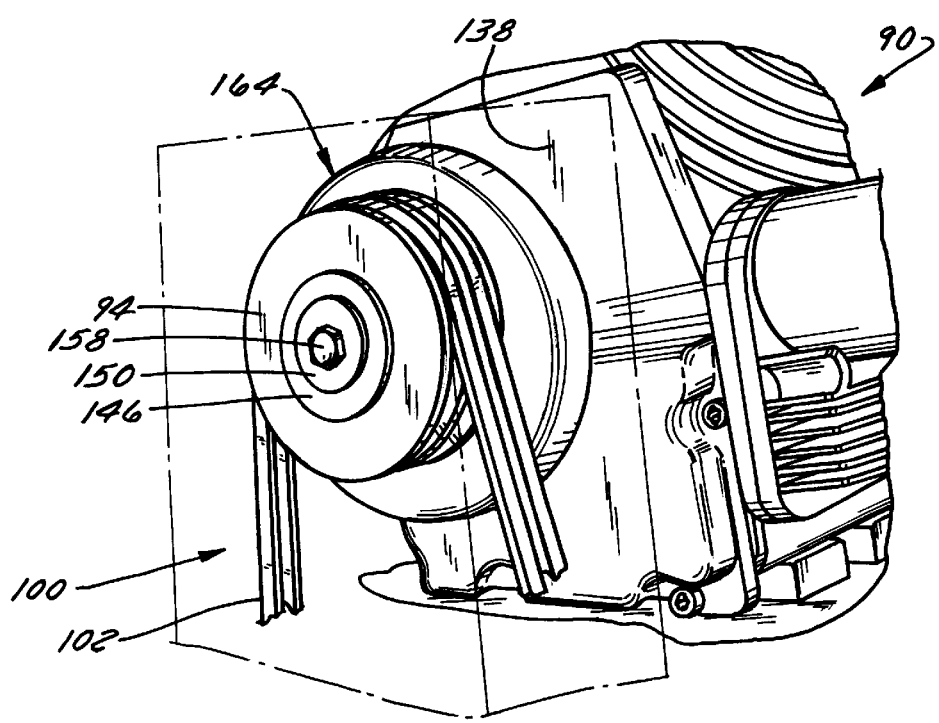
FIG. 5 is an enlarged fragmentary perspective view of the clutch mounted on the drive shaft of the engine.

Referring to FIGS. 3 & 4, the clutch 32 consists of a stationary field rotor 136 immovably mounted to the engine block 138 or another stationary part of the engine 90, a bobbin 140 keyed to the drive shaft 92 for rotation in unison with the drive shaft 92, and the drive pulley 94 supported on the bobbin 140 by at least one bearing 142 with relative axial movement between the pulley 94 and bobbin 140 caused by energization of the field rotor 136 engaging the pulley 94 with the bobbin 140 thereby causing the pulley 94 to rotate preferably substantially in unison with the bobbin 140 and, thus, the drive shaft 92. As such, when energized, the clutch 32 causes power to be transferred from the drive shaft 92 through the bobbin 140 to the drive shaft pulley 94 where the belt 102 transmits the power, in the form of torque, to the driven shaft pulley 86, to the driven shaft 84 and ultimately to the cutting wheel 34. When the clutch 32 is deenergized, the drive shaft pulley 92 and bobbin 140 disengage allowing the pulley 92 to rotate on its bearing 142 freely relative to the drive shaft 92 and bobbin 140 thereby preventing rotary mechanical power from being transmitted from the engine 90 to the cutting wheel 34.

The bobbin 140 preferably is keyed to the drive shaft 92 in a manner such that it can slide at least slightly axially along the shaft 92 so that it can be urged axially outwardly toward the drive shaft pulley 94 by the field rotor 136 when electric current is applied to the field rotor 136 through wires 144. To more securely mount the bobbin 140 on the shaft 92 to help ensure transmission of greater torque from the shaft 92 to the bobbin 140, the shaft 92 can have a plurality of circumferentially spaced apart grooves that receive complementary keys of the bobbin 140. To limit the axially outward movement of both the bobbin 140 and pulley 94, the clutch 32 has a stop plate 146 secured to the axial outer end of the drive shaft 92 by a bolt 148 that can include a lock washer 150 or the like between the head of the bolt 148 and the plate 146. Preferably, at least one of the input wires 144 of the field rotor 136 is ultimately in electrical communication with a switch 170 and at least one of the other of the wires 144 is ultimately in electrical communication with the power supply 110.

During operation of the clutch 32, energization of the field rotor 136 causes the bobbin 140 to be urged axially outwardly away from the engine block 138 toward the pulley 94. The bobbin 140 has a radially outwardly extending arm 152 that is constructed to be repelled by a magnetic field generated by the rotor 136 so that upon application of electric current through the wires 144 to the field rotor 136, the bobbin 140 is urged toward the pulley 94. The arm 152 of the bobbin 140 also has an axially outwardly facing engagement surface 154 that directly contacts an axially inwardly facing part of the pulley 94 to couple the bobbin 140 to the pulley 94 when the field rotor 136 is energized to transmit torque from the bobbin 140 to the pulley 94 ultimately causing the pulley 94 to rotate substantially in unison with both the bobbin 140 and drive shaft 92. Preferably, the bobbin 140 and the pulley 94 either frictionally engage each other or directly mechanically couple when the field rotor 136 is energized to cause torque to be transmitted from the drive shaft 92 to the pulley 94. The engagement surface of either the bobbin 140, the pulley 94, or both preferably include a spring mechanism or a biasing means for urging the bobbin 140 away from the pulley 94 when the field rotor 136 is deenergized so that the pulley 94 decouples or disengages from the bobbin 140 when the clutch is deenergized.

To help locate the bobbin 140 relative to the field rotor 136, there can be a bearing 156 disposed between a support bracket 158 of the field rotor 136 and an axially inwardly extending portion of the bobbin 140. To immovably mount the field rotor 144 to the engine block 138, the bracket 158 has a mounting portion 160 which is secured to the engine block 138 by one or more bolts 162. Although not shown in FIG. 5, the field rotor 136 and the clutch housing 164 can be immovably mounted by one or more bolts or other fasteners about the periphery of the clutch 32.

Preferably, the clutch 32 is a model MA-GT-D30 magnetic clutch manufactured by Ogura Clutch Co., Ltd., of Kiryu, Japan and marketed and distributed by Kanematsu USA, Inc. of Somerset, N.J., has a forty watt field rotor coil and is constructed to handle a torque capacity of about two hundred and twenty-five foot-pounds. If desired, the same commercially available clutch 32 can be constructed with a fifty watt field rotor coil and possess a torque capacity of about two hundred and fifty foot-pounds.

Other exemplary and suitable clutch constructions that can be used for clutch 32 include one or more of the electromagnetic clutches disclosed in U.S. Pat. Nos. 5,445,256; 5,252,874; 5,141,090; 4,635,774; 4,446,392; and 4,502,578, the disclosures of each of which are expressly incorporated herein by reference. Although the clutch 32 is shown mounted to the engine block 138 and on the drive shaft 92, a clutch of similar or like construction can be mounted on the driven shaft 84 with its field rotor and/or housing preferably immovably affixed to the cutting wheel shroud 60.

Energization of the clutch 32 is preferably controlled by the deadman's switch arrangement 36. Referring to FIG. 6, the deadman's switch arrangement 36 is constructed and arranged so as to be gripped by at least one hand 48 of an operator 48 holding one of the handle grips 120 of the handle bar 118 such that an electric switch 170 of the arrangement 36 closes causing electric current to be applied to the clutch 32, energizing the clutch 32, and causing rotary mechanical power from the engine 90 to be transmitted to the cutting wheel 34. By this construction of an electromagnetic clutch 32 and deadman's type switch arrangement 36, an operator 48 of the pavement cutting machine 30 can temporarily advantageously leave the machine 30 unattended without having to first stop the engine 90 because upon release of the hand grips 120 the clutch 32 is deenergized thereby preventing rotary mechanical power from being transmitted from the engine 90 to the cutting wheel 34.

Referring to FIG. 6, the electrical clutch energizing switch 170 is carried by a bracket 172 mounted to the handle bar 118. The deadman's switch arrangement 36 further includes a switch actuator 174 that is pivotally attached to the handle 46 and which has a hand grippable outwardly extending hand grip portion 176 that is generally parallel to the handle grip 120 of the handle 46. During operation, the switch actuator 174 can be moved between a switch actuating position where at least a portion of the switch actuator 174 is in engagement with the clutch energizing switch 170, causing the switch 170 to close, and a position disposed away from the switch actuating position where the switch 170 is open. Preferably, when the switch actuator 174 is in the switch actuating position, the hand grip 176 of the switch actuator 174 is disposed against the handle grip 120 of the handle bar 118.

In a preferred deadman's switch arrangement 36 shown in FIG. 6, the switch bracket 172 is generally C-shaped having a lower leg 178 spaced from an upper leg 180 that carries the clutch energizing switch 170. The switch actuator 174 preferably is a generally T-shaped rod or adjoined pair of rods 182 that includes a pair of outturned arms 184 & 186 pivotally received in a bore in each handle beam 114 & 116, a central shank portion 188 received between the legs 178 & 180 of the switch bracket 172, and a pair of outturned arms 190 & 192 that are both generally parallel to the handle grips 120 of the handle 46 for easy grasping by an operator 48.

When the shank 188 of the switch actuator rod 182 is received between the legs 178 & 180 of the switch mounting bracket 172, the legs 178 & 180 serve generally as limits of movement for the switch actuator 174. As is shown in FIG. 6, when in the switch actuating position with the hand grip arms 190 & 192 generally against the handle grips 120, the shank 188 of the switch actuating rod 182 preferably bears directly against the clutch energizing switch 170 near the upper leg 180 of the switch bracket 172.

Preferably, the clutch energizing switch 170 is a switch capable of energizing the clutch 32 when the hand grip 176 of the switch actuator 174 is brought adjacent to and preferably against a handle grip 120 of the handle bar 118 when an operator 48 grasps one or both of the handle grips 120. Preferably, the switch 170 is a normally open electrical switch that closes as a result of being engaged or triggered by the switch actuator 174. If desired, the switch 170 can also be a proximity switch that closes when the switch actuator 174 is moved sufficiently near the switch 170 or when it bears directly against the switch 170. Such a proximity switch can be a hall effect sensor or the like capable of sensing when a metal switch actuating rod 182 or a metallic portion of the rod 182 capable of being sensed by the switch is nearby. If desired, a combination switch and relay mechanism can be used in a like manner as the switch 170 to control energization of the clutch 32 by detecting when the operator has one or both hands on the handle grip 120. Similarly, a capacitance-type switch in electrical communication with the pavement cutting machine handle can also be used as the switch 170 by detecting when an operator has grasped a handle grip 120 of the handle 46 to cause the clutch 32 to be energized.

Figure 7:
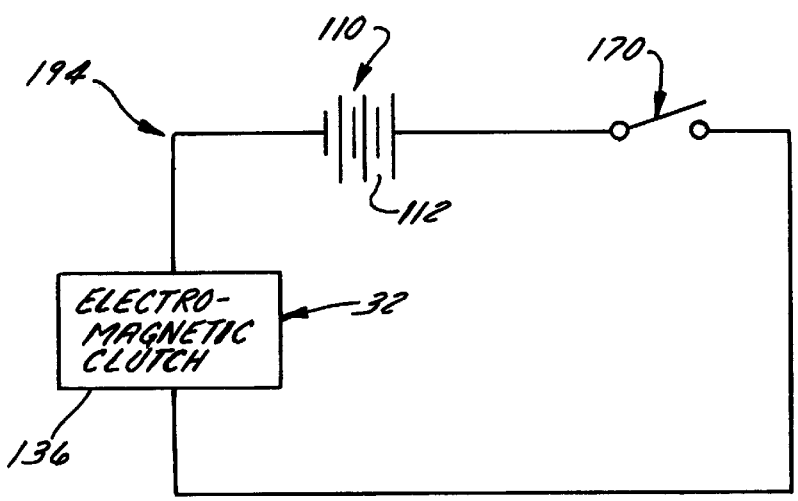
FIG. 7 is an electrical schematic of a circuit for controlling operation of the clutch.

An example of a suitable electrical circuit 194 for controlling operation of the clutch 32 is shown in FIG. 7. The clutch 32 is wired in series with a power supply 110 that preferably is a battery 112, magneto, generator or alternator of the pavement cutting machine 30 and which is wired in series with the clutch energizing switch 170. When the operator 48 grips both the handle grip 120 of the handle bar 118 and the hand grip 176 of the switch actuator 174, the clutch energizing switch 170 is closed energizing the clutch 32 causing it to transfer power from the engine 90 to the cutting wheel 34.

Figure 8:
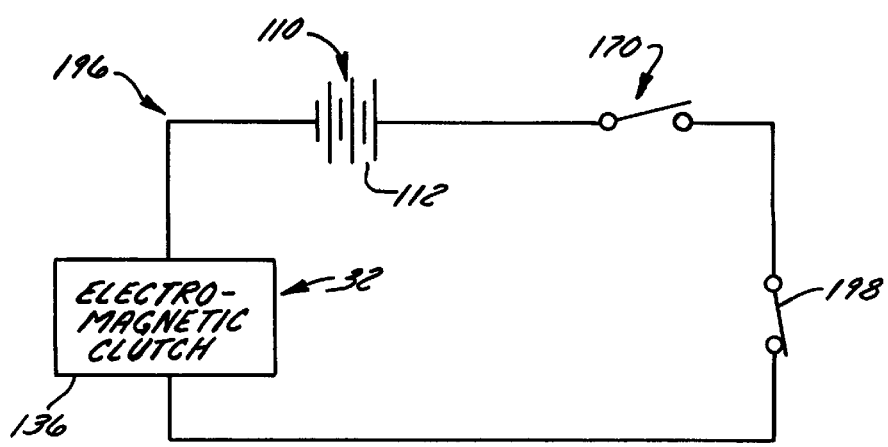
FIG. 8 is an electrical schematic of a second circuit for controlling operation of the clutch.

Another suitable clutch energizing circuit 196 is shown in FIG. 8. The circuit 196 shown in FIG. 8 is substantially identical to the circuit 194 shown in FIG. 7 except that there is another switch 198 in series with the clutch energizing switch 170, power supply 110 and clutch 32. Referring additionally to FIG. 6, this switch 198 preferably is a normally closed switch that opens when the pavement cutting machine 30 is tipped, such as when the machine 30 is tipped forwardly toward the position shown in FIG. 1. As such, this switch 198 preferably is a safety switch that preferably opens at least when the pavement cutting machine 30 is tipped forwardly to prevent power from being applied to the cutting wheel 34 when the machine 30 is tipped forwardly.

Such a switch 198, shown in FIG. 6 mounted to one of the handle beams 114, preferably is a position sensitive switch that preferably can be a mercury switch or the like that remains closed when the pavement cutting machine 30 is in a generally horizontal operating position (FIG. 2) but opens such as when the machine 30 is tipped away from the generally horizontal operating position in any direction by a certain amount. Preferably, the exact pavement cutting machine angle at which the safety switch 198 opens can be determined through routine experimentation and testing so that the clutch 32 will not be inadvertently deenergized during normal operation and will only be deenergized when the machine 30 is tipped by an amount that can unsafely expose a portion of the cutting wheel 34 to the operator 48.

Although not shown, the pavement cutting machine 30 of this invention can also be equipped with a brake that stops the rotating cutting wheel 34 upon the clutch 32 being deenergized. If desired, the clutch 32 can be integrally constructed in combination with such a brake that activates upon deenergizing the clutch 32 to cause the cutting wheel 34 to stop rotation. However, if desired, such a brake can be independent of the clutch 32 and energized or activated manually, independently of, or automatically preferably substantially immediately upon or after the deenergization of the clutch 32. However, such a braking mechanism may not be needed or used particularly where the cutting wheel 34 is in engagement with the pavement 50 and contact with the pavement 50, such as is shown in FIG. 3, functions like a braking mechanism to slow down or stop the cutting wheel 34 when the clutch 32 is deenergized.

In use, a pavement cutting machine 30 of this invention is preferably used to open and clean random cracks and other discontinuities or flaws in pavement 50 which can cause the pavement 50 to further degrade if not cleaned and patched. Additionally, a pavement cutting machine 30 of this invention is also well suited for use in routing and cleaning expansion joints in pavement 50 that need to be refurbished or repaired. The pavement cutting machine 30 of this invention is well suited for use with various types of pavement 50 including asphalt and concrete as well as other hard or hardened aggregate, rock, or rock-like materials.

In operation, with the engine 90 of the pavement cutting machine 30 running, the handle grip 120 of the handle bar 118 is grasped by an operator 48 also causing the hand grip 176 of the switch actuator 174 to be grasped urging the switch actuator 174 toward its switch closing position thereby causing the clutch 32 to be energized. Upon the clutch energizing switch 170 being closed, electrical current flows to the clutch 32 causing it to rotatively couple the drive pulley 94 to the drive shaft 92 of the engine 90.

Upon or shortly after coupling, the drive pulley 94 begins rotating substantially in unison with the drive shaft 92 thereby causing rotary power to be transmitted by the belt 102 to the driven pulley 86 and driven shaft 84. As a result of rotary power being transmitted to the driven pulley 86 and shaft 84, rotation of the cutting wheel 34 occurs. If not already rotating, the cutting wheel 34 begins to rotate upon energizing the clutch 32. Thereafter, the pavement cutting machine 30 can be used in a conventional and well known manner to clean, rout and open cracks in pavement 50 or the like in preparation to fill and seal the cracks.

Should the operator 48 need to walk away from the machine 30 while desiring to leave its engine 90 operating, the operator 48 simply releases the handle grips 120 thereby releasing the hand grips 176 causing the switch actuator 174 to move away from its switch closing position. When the switch actuator 174 moves away from its switch closing position, the clutch energizing switch 170 opens disengaging the drive pulley 94 from the drive shaft 92 allowing the engine 90 to remain safely operating while unattended because power is no longer being transferred to the cutting wheel 34.

To service the cutting wheel 34 preferably with the engine 90 off and the cutting wheel 34 stationary, the pavement cutting machine 30 is tipped forwardly until it rests upon the stand 40, such as in the manner depicted in FIG. 1. As the machine 30 is tipped forwardly, the stand 40 swings outwardly, away from the cutting wheel 34 and shroud 60 such that it advantageously self locates automatically in a pavement cutting machine supporting position where it engages the pavement 50 or ground preferably without requiring an operator to manually position the stand 40. With the machine 30 supported on the stand 40, a portion of the cutting wheel 34 is exposed such that it can be serviced by the operator or a service person. Preferably, service of the cutting wheel 34, including any of its disks or cutting elements, can be done without requiring the brake or skid plate 76 to be even partially removed.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A pavement cutting machine comprising:
   (a) a frame having a handle that is grasped during operation, said frame having a longitudinal axis;
   (b) a pair of spaced apart wheels carried by said frame for supporting the pavement cutting machine on a pavement surface and enabling the pavement cutting machine to be moved;
   (c) a rotary pavement cutting wheel for engaging and abrading said pavement surface, said cutting wheel 1) carried by said frame in operable communication with a driven shaft that is operably associated with a first pulley, 2) comprising a pair of spaced apart discs with a plurality of pairs of replaceable and circumferentially spaced apart star-shaped cutting elements, wherein each said cutting element is constructed and arranged to engage said pavement surface, 3) having an axis of rotation that is generally transverse to the longitudinal axis of said frame, and 4) weighing at least fifty pounds;
   (d) an internal combustion engine carried by said frame and having a drive shaft that extends generally transversely relative to the longitudinal axis of said frame;
   (e) an electromagnetic clutch connected directly to said drive shaft of said internal combustion engine and operably associated with a second pulley;
   (f) a belt linking said first pulley and said second pulley;
   (g) a supply of electrical power electrically connected to said electromagnetic clutch;
   (h) an electric deadman's switch operably associated with said handle that controls application of electrical power from said supply of said electrical power to said electromagnetic clutch; and
   (i) wherein 1) said pavement surface comprises one of concrete and asphalt, 2) wherein application of electrical power from said supply of said electrical power to said electromagnetic clutch energizes said electromagnetic clutch coupling said internal combustion engine with said cutting wheel, 3) wherein said deadman's switch deenergizes said electromagnetic clutch when said handle is released, and 4) impact of the cutting elements of the cutting wheel with said pavement surface self-propels the machine relative to said pavement surface.

2. The pavement cutting machine of claim 1 wherein said cutting wheel has a mass such that said cutting wheel weighs at least about eighty pounds when under the influence of the gravity of the Earth.

3. The pavement cutting machine of claim 1 wherein said electrical power supply comprises a direct current battery carried by said frame.

4. The pavement cutting machine of claim 1 wherein said switch is a normally open switch.

5. The pavement cutting machine of claim 1 wherein said handle further comprises a handle bar with at least one handle grip adapted to be grasped by a pavement cutting machine operator and wherein said deadman's switch is operably associated with said handle bar and said handle grip for causing said electromagnetic clutch to couple said internal combustion engine to said cutting wheel when said handle grip is grasped by said operator.

6. The pavement cutting machine of claim 5 wherein said deadman's switch comprises a bracket mounted on said handle bar, an electrical switch carried by said bracket, and a switch actuator pivotally mounted to said handle having a hand grip portion adjacent said handle grip of said handle which is constructed and arranged to be gripped by said operator when said operator grasps said handle grip and to close said switch when said operator grasps said handle grip.

7. The pavement cutting machine of claim 6 wherein said switch actuator is pivotally movable between (1) a switch actuating position when said handle grip is grasped such that said switch actuator is located adjacent said switch where said actuator causes said switch to energize said clutch and couple said prime mover to said cutting wheel and (2) a position disposed from said switch actuating position when said handle grip is released wherein said switch causes said electromagnetic clutch to be deenergized causing substantially no rotary mechanical power to be transferred from said internal combustion engine to said cutting wheel.

8. The pavement cutting machine of claim 1 wherein the pavement cutting machine has a generally horizontal operating position and further comprising a safety switch in electrical communication with said clutch and said electrical power supply with said safety switch constructed and arranged to deenergize said clutch if the pavement cutting machine is tipped from said generally horizontal operating position.

9. A pavement cutting machine comprising:
   (a) a frame;
   (b) a wheel carried by said frame for supporting the pavement cutting machine on a pavement surface;
   (c) a rotary pavement cutting wheel for cutting said pavement surface wherein said cutting wheel 1) is rotatively carried by said frame, 2) has a generally horizontal axis of rotation, 3) has a mass such that it weighs at least about 50 pounds, and 4) has a plurality of generally star-shaped and removable cutting elements;
   (d) an internal combustion engine having a transversely extending drive shaft; and
   (e) an electromagnetic clutch mounted to said engine and attached to said drive shaft for selectively coupling said engine to said cutting wheel.

10. The pavement cutting machine of claim 9 wherein said electromagnetic clutch has a torque capacity of about 225 foot-pounds.

11. The pavement cutting machine of claim 9 wherein said electromagnetic clutch comprises a 40 watt field rotor coil.

12. The pavement cutting machine of claim 9 wherein said electromagnetic clutch comprises a 40 watt field rotor coil and has a torque capacity of about 225 foot-pounds.

13. The pavement cutting machine of claim 9 wherein said electromagnetic clutch has a torque capacity of about 250 foot-pounds.

14. The pavement cutting machine of claim 9 wherein said electromagnetic clutch comprises a 50 watt field rotor coil.

15. The pavement cutting machine of claim 9 wherein said electromagnetic clutch comprises a 50 watt field coil and has a torque capacity of about 250 foot-pounds.

16. A pavement cutting machine comprising:
   (a) a frame;
   (b) a pair of spaced apart wheels carried by said frame for supporting the pavement cutting machine on a pavement surface;

(c) a generally disc-shaped generally vertically oriented rotary pavement cutting wheel for cutting said pavement surface wherein said cutting wheel 1) is rotatively carried by said frame, 2) has a pair of outer sides and a radial outer periphery, 3) has a generally horizontal axis of rotation, 4) has a pair of axially spaced apart discs, and 5) has a plurality of pairs of circumferentially spaced apart generally star shaped cutting elements carried by at least one of said discs;

(d) a generally vertically oriented shroud carried by said frame and disposed adjacent said pavement surface substantially enclosing said sides and said radial outer periphery of said cutting wheel;

(e) a handle carried by said frame for pulling the pavement cutting machine during cutting of said pavement surface;

(f) an internal combustion engine having a transversely extending drive shaft;

(g) an electromagnetic clutch operably coupling said cutting wheel to said engine when energized and decoupling said cutting wheel from said engine when deenergized;

(h) an electrical power source carried by said frame and in electrical communication with said electromagnetic clutch; and (i) a switch in electrical communication with said electrical power source and said electromagnetic clutch wherein said switch has a first position that energizes said electromagnetic clutch and a second position that deenergizes said electromagnetic clutch.

17. A pavement cutting machine comprising:

(a) a frame;

(b) a pair of spaced apart wheels carried by said frame for supporting the pavement cutting machine on a pavement surface;

(c) a generally disc-shaped rotary cutting wheel for cutting said pavement surface wherein said cutting wheel 1) is rotatively carried by said frame, 2) has a generally horizontal axis of rotation, and a plurality of pairs of removable cutting elements;

(d) a shroud carried by said frame that is disposed arcuately around a portion of said rotary cutting wheel;

(e) a handle carried by said frame for maneuvering the pavement cutting machine during cutting of said pavement;

(f) an internal combustion engine;

(g) an electromagnetic clutch operably coupling said cutting wheel to said engine when energized and decoupling said cutting wheel from said engine when deenergized;

(h) an electrical power source carried by said frame and in electrical communication with said electromagnetic clutch;

(i) a first switch carried by said handle wherein said first switch 1) is in electrical communication with said electrical power source and said electromagnetic clutch, 2) has a first position that enables said electromagnetic clutch to be energized, and 3) has a second position that deenergizes said electromagnetic clutch;

(j) a second switch carried by said frame wherein said second switch 1) is in electrical communication with said electrical power source and said electromagnetic clutch, 2) has a first position that enables said clutch to be energized, and 3) has a second position that deenergizes said clutch;

(k) wherein said first switch is manually urged to said first position by an operator grasping said handle;

(l) wherein the pavement cutting machine has a generally horizontal operating position wherein said cutting wheel engages said pavement and a position disposed from said generally horizontal operating position wherein said cutting wheel does not engage said pavement;

(m) wherein said second switch is disposed in said first position when the pavement cutting machine is disposed in said generally horizontally operating position; and (n) wherein said second switch is disposed in said second position deenergizing said electromagnetic clutch when the pavement cutting machine is disposed in said position disposed from said generally horizontal operation position; and (o) wherein said clutch is energized when 1) said operator grasps said handle urging said first switch toward said first position and 2) the pavement cutting machine is disposed in said generally horizontal operating position causing said second switch to be urged toward said first position.

* * * * *